Aug. 4, 1964 J. J. BYBERG 3,143,336
METERING IMPROVEMENT FOR FEED MIXERS
Filed May 9, 1960 2 Sheets-Sheet 1

INVENTOR.
JONAS J. BYBERG
BY
ATTORNEY

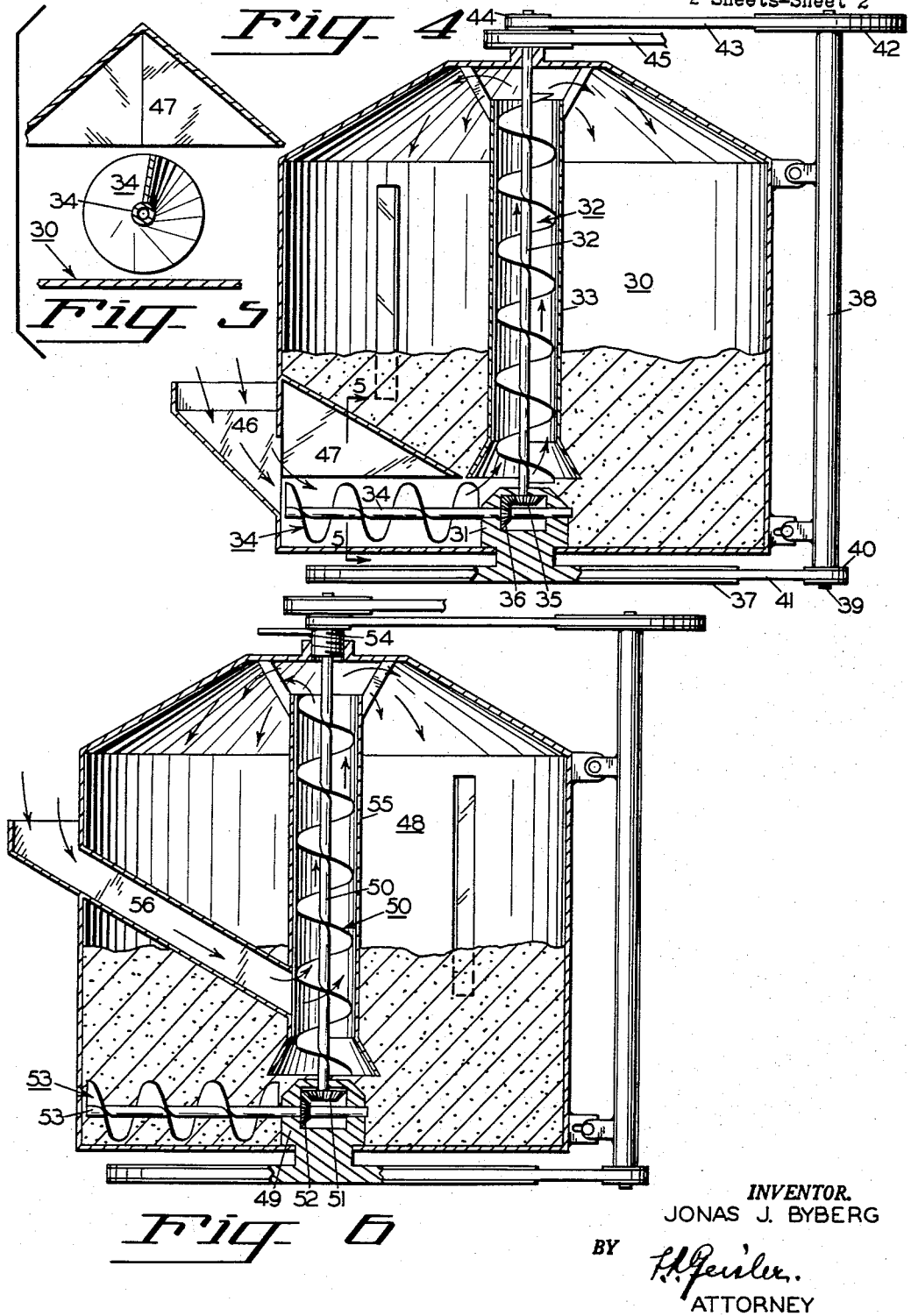

United States Patent Office 3,143,336
Patented Aug. 4, 1964

3,143,336
METERING IMPROVEMENT FOR FEED MIXERS
Jonas J. Byberg, 511 N. Water St., Silverton, Oreg.
Filed May 9, 1960, Ser. No. 27,635
3 Claims. (Cl. 259—97)

This invention, like that described in my companion application entitled "Adjustable Feed Mixer," is concerned with the mixing of feed materials for farm animals, and similarly relates to the employment of the type of feed mixer in which a central vertical rotating auger is used for mixing the materials in the mixing tank.

For the mixing of the different ingredients in proper proportions in the various formulas used for the feeding of livestock it has usually been necessary to provide more or less elaborate equipment for weighing or measuring the different ingredients separately, so that right amounts of these will be delivered into the mixing tank for the required mixing. It is possible, however, by setting marks on the tank to indicate different level heights to which the level of the material in the tank has been found to be raised by additions of definite amounts of material, to save time and labor when delivery of such amounts are required in subsequent mixing operations. Such marking for different levels may be placed on the inside of the tank, but, preferably, by providing a transparent window in the tank wall, such marking can be placed on the outside of the tank. Obviously, however, it is necessary that all material when delivered into the tank be leveled out in the tank, otherwise the marking would be practically useless.

A central vertical auger, positioned in a conveyor tube, in the mixing tank, lifting material from the lower portion of the tank and depositing it at the top of the tank, will, by causing the lifted material to be discharged in all directions from the top of the auger and conveyor tube, deposit the material in a form of a layer at the top of the tank. Consequently if the various ingredients to be mixed in the tank could be delivered into the tank successively through the intermediary of the central rotating auger no other means for leveling off the tank contents would be necessary.

The object of the present invention is to provide suitable and practical means whereby amounts of materials delivered into the tank or feed mixer equipped with a mixing auger can be observed and metered from the outside of the tank during the delivery of such materials without requiring the weighing or metering of the materials prior to their delivery into the tank.

A related specific object of the invention is to provide means whereby various ingredients and other materials to be delivered successively into the mixing tank for required mixing can be delivered and distributed evenly in the form of layers of material in the tank through the intermediary of the central vertical rotating auger in the tank.

Since the rotation of the central auger in such mixing tanks however ordinarily produces a mixing circulation of material in the tank by lifting material from the bottom of the tank and depositing the lifted material at the top of the tank, the delivery of a new ingredient into the tank through the intermediary of the rotating auger during such normal performance by the auger would result in the new ingredient being mixed with some old material and the new ingredient and some of the old material discharged at the top of the tank by the auger. This would prevent the new ingredient, when delivered into the tank, from appearing as a separate added layer on the material already in the tank, and would interfere with the amount of added material being accurately indicated.

Accordingly a further specific object of the invention is to provide means, in a mixing tank of the type indicated, by which the mixing circulation of material in the tank can be temporarily prevented, in spite of the rotation of the mixing auger, while the feeding of materials into the tank up to desired pre-set levels through the intermediary of the auger takes place.

These objects are attained through the present invention with a mixing tank having either a conical bottom portion or a flat bottom wall, and are attained in the manner indicated in the following brief description with reference to the accompanying drawings:

In the drawings, which are more or less diagrammatic:

FIG. 4 is a sectional elevation of a mixing tank having a flat bottom, with the feed inlet located in the side wall of the tank close to the bottom;

FIG. 5 is a fragmentary section taken on line 5—5 of FIG. 4; and

FIG. 6 is a side elevation of a similar flat bottom tank showing a feed inlet chute leading to the conveyor tube for the auger.

Figure 1:
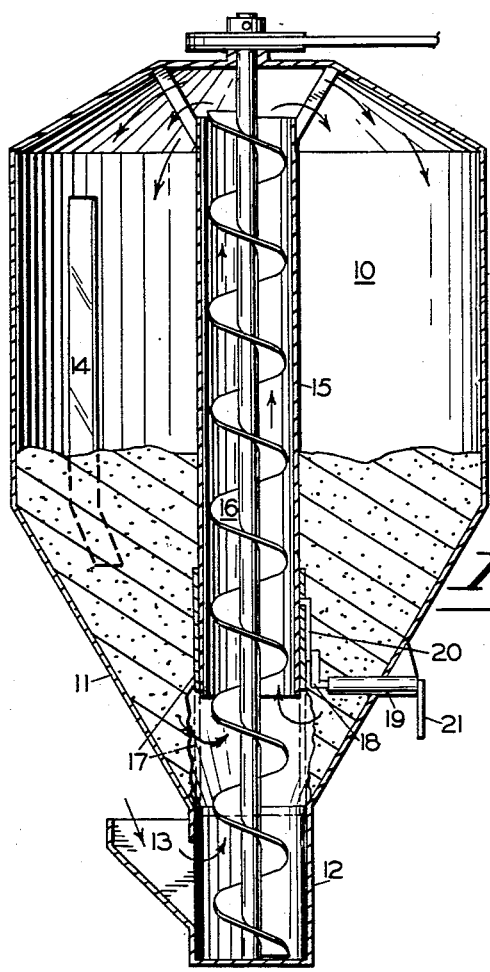
FIG. 1 is a sectional elevation of a mixing tank having a conical bottom portion with a lower extension, showing a feed inlet located at the bottom of the tank.

Referring first to FIG. 1, the mixing tank 10 has a conical bottom portion 11 and a bottom extension 12 in which bottom extension a feed inlet 13 is located. The tank is provided with a suitable window 14 through which the level or height of the material in the tank can be readily observed and it is assumed that suitable markings (not shown) are placed on the outside of the tank adjacent the window 14 to indicate the volume amounts represented by the various level markings, the markings having been previously set as a result of test deliveries into the tank of carefully metered or weighed amounts of the materials to be used. A stationary conveyor tube 15 surrounds the auger 16. The bottom of the conveyor tube 15 is open and terminates above the bottom of the tank and above the feed inlet 13.

An extension sleeve 17 is adjustably mounted on the lower portion of the conveyor tube 15, the external diameter of the sleeve being only slightly greater than the internal diameter of the bottom extension 12 of the tank. When the extension sleeve 13 is in the normal raised position, as indicated by the full lines in FIG. 1, the rotation of the auger 16 will cause the material from the lower portion of the tank (together with any additional material which is being delivered into the tank through the inlet 13) to be lifted by the auger and distributed from the top of the auger and conveyor tube and deposited as a layer in the tank. Thus if additional material is being delievered into the tank, the mixing of the new material with the material already in the lower portion of the tank would prevent the new material appearing as a separate distinct layer to be observed at the window 14.

However, when the extension sleeve 17 is lowered to the broken line position of FIG. 1, access to the auger and to the lower end of the conveyor tube by the material in the bottom portion of the tank is shut off, whereupon the new material delivered through the feed inlet 13 will be lifted by the auger and distributed by the auger as a layer in the tank without the inclusion of other material already in the tank. In such manner the amount of new material will be accurately disclosed by reference to the markings at the window 14. The lowering and raising of the extension sleeve 17 is accomplished by any suitable means such as a crank 18 supported in a bearing bracket 19, having a link connection 20 with the sleeve 17, and operated by a handle 21 on the outside of the tank.

Figure 3:
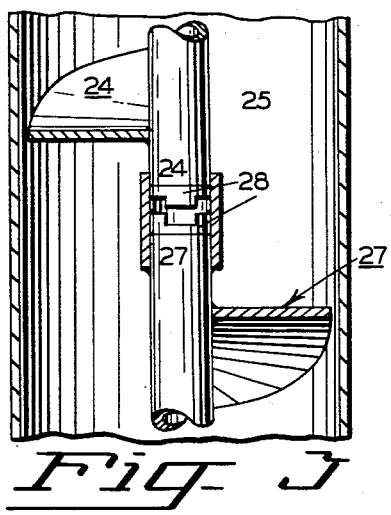
FIG. 3 is a fragmentary section taken on line 3—3 of FIG. 2 and drawn to a larger scale, showing a simple clutch which may be used for connecting the aligned shafts of the upper and lower augers.
Figure 2:
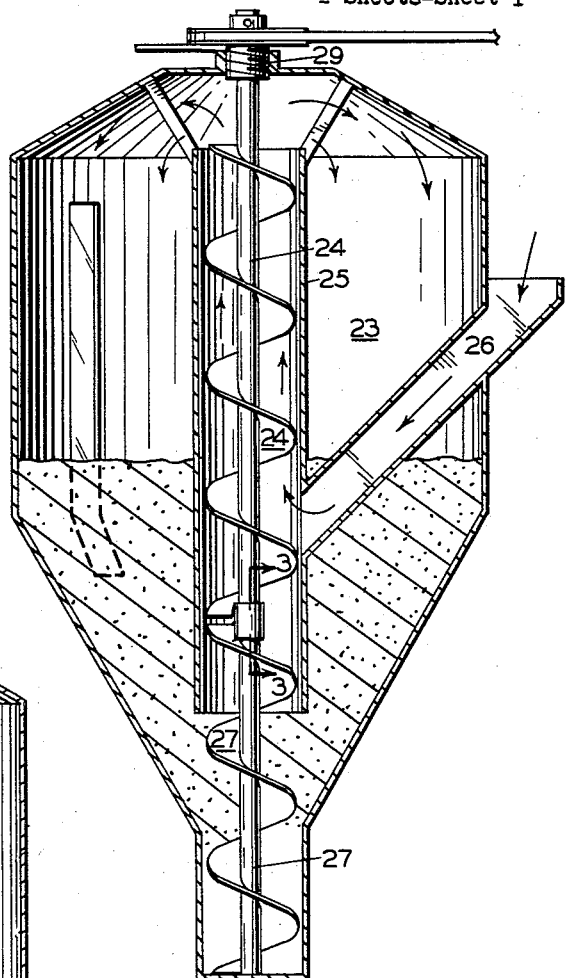
FIG. 2 is a sectional elevation of a similarly shaped mixing tank showing in full lines a feed inlet chute leading to the conveyor tube for the auger and showing a modified auger construction.

In FIG. 2 the tank 23 has a central vertical auger 24 located in a conveyor tube 25, which, like the conveyor tube 15 of FIG. 1, terminates above the bottom of the tank. An inlet feed chute 26 leads to the conveyor tube 25. In this modified construction however a lower or supplemental auger 27 extends from the main auger 24 to the bottom of the tank, and the shaft 27 of the lower auger 27 is connected with the shaft 24 of the main auger, with which it is in alignment, by a simple clutch 28, which clutch is shown more clearly in FIG. 3.

The bottom end of the shaft 27 of the lower auger 27 of FIG. 2 is rotatably mounted in suitable bearings in the bottom of the tank, which bearings also hold this shaft against movement in an axial direction or upwardly. The upper end of the shaft 24 for the upper auger 24 extends through the top of the tank and is supported in a threaded bearing 29 which can be turned to cause the shaft 24 to be lifted sufficiently to cause the clutch 28 to be disengaged. When this occurs the lower auger 27 ceases to rotate with the upper auger 24 and the lower auger becomes entirely inactive. Since the bottom end of the upper auger does not extend down to the bottom end of the conveyor tube 25 the rotation of the upper auger without rotation of the lower auger will not cause any lifting material from the bottom of the tank. Under such conditions the delivery of new material into the tank through the chute 26 will cause such new material alone to be distributed by the upper auger at the top of the tank.

In FIG. 4 the mixing tank 30 has a flat bottom. A gear housing 31 is rotatably mounted in the center of the bottom. The central vertical auger 32 is located in the stationary conveyor tube 33 and the lower end of the shaft 32 for the auger 32 is mounted in the gear housing 31. The gear housing 31 also supports the shaft 34 for a lower horizontal auger 34. Meshing bevel gears 35 and 36 secured to the shafts 32 and 34 respectively cause the lower auger to be rotated by rotation of the upper auger.

The gear housing 31 has a small diameter portion which extends through the tank bottom and is rotatably mounted in suitable bearings and carries a bottom pulley 37. Rotation of the pulley 37 causes the lower horizontal auger 34 to move around in the bottom of the tank. The auger 34 acts to feed material from the lower portion of the tank to the vertical auger 32 to be lifted by the latter.

An outside sleeve 38, supported on the tank 30, carries a shaft 39. A pulley 40 secured to the bottom of the shaft 39 is connected by a belt 41 with the pulley 37. A pulley 42 secured to the top of the shaft 39 is connected by a belt 43 with a pulley 44 secured to the top of the shaft 32 of auger 32. Auger 32 is rotated by belt and pulley connection 45 with a source of power (not shown).

Thus, with the belts 41 and 43 connected, rotation of auger 32 causes the lower auger 34 to move around in the bottom of the tank while this lower auger is also rotated by its gear connection with auger 32. However, by disconnecting either of the belts, the lower auger can be made to remain in a stationary location.

The tank 30 has an inlet feed opening 46 near the bottom of the tank. A hood 47 (see also FIG. 5) extends from this inlet opening to the bottom of the conveyor tube 33. The purpose of this hood 47 is to prevent material in the lower portion of the tank from coming into contact with the horizontal auger 34 while this auger 34 is in registration with the feed inlet 46. Consequently when the auger 34 is in position under the hood 47 and in registration with the feed inlet 46, if further movement of the auger 34 around in the bottom of the tank is temporarily prevented by disconnecting of either of the belts 41 or 43, the rotation of the main vertical auger 32, causing rotation of the auger 34, will result in the new material, delivered into the feed inlet 46, being conveyed by auger 34 to the bottom of the tube 33 and to auger 32, and being lifted upwardly by the latter and distributed at the top of the tank without the mixing of any appreciable amount of the material already in the tank with the new material being delivered into the tank in this manner.

In the further modified manner in which the invention may be carried out, as illustrated in FIG. 6, the tank 48, having a flat bottom, has a gear housing 49 rotatably mounted in the center of the tank bottom, similar to the construction previously described with reference to FIG. 4. The bottom end of the shaft 50 for the vertical auger 50 is rotatably mounted in the housing 49 and carries a bevel gear 51 which normally meshes with a bevel gear 52 on a shaft 53 of the lower horizontal auger 53, which is rotatably supported by the housing 49.

In this modified construction, however, the vertical auger shaft 50 may be raised sufficiently to disconnect the gears 51 and 52 and thus prevent the bottom auger 53 from being rotated. The upper end of the auger shaft 50 extends through the top of the tank and is supported in a threaded bearing 54 which can be turned so as to lift the shaft 50 sufficiently to raise gear 51 out of engagement with gear 52. When the lower auger 53 is rendered entirely inactive in this way material from the bottom of the tank is prevented from being fed to the vertical auger 50 and thus from being carried up by the latter to the top of the conveyor tube 55.

An inlet feed chute 56 leads to the vertical auger 50. When the lower auger 53 is entirely inactive the feeding of material into the tank through the feed chute 56 will enable the new material to be disbursed by the auger 50 without having any of the material already in the tank mixed in with the new material as delivered.

The inlet feed chute for the tank in FIG. 6 could of course be located higher in the tank. Similarly in FIG. 2 the inlet feed chute 26 could be located in the top of the tank and leading to the top of the auger 24. Other modifications similarly would be possible without departing from the principle of the invention. It is not intended that this invention should be limited otherwise than as set forth in the claims.

I claim:
1. In a feed mixer, a mixing tank, a vertical main mixing auger centrally positioned in said tank, an inlet feed opening leading to said main auger, means for rotating said main auger, a conveyor tube encompassing said main auger, the bottom end of said tube terminating above the bottom of said tank, a cooperating lower auger in said tank for feeding material in the lower portion of said tank to said bottom end of said tube and to said main auger, means carried by said main auger and located within the tank for rotating said cooperating lower auger with said main auger, and means for disconnecting said lower auger from said main auger for rendering said lower auger inactive to feed material from the lower portion of said tank to said tube and main auger, whereby to restrain the mixing of material already in said tank and additional material being distributed in said tank with the rotation of said auger.

2. In a feed mixer, a cylindrical mixing tank having a substantially flat bottom, a vertical auger centrally positioned in said tank, means for rotating said auger, a conveyor tube surrounding said auger, said tube being open at the bottom, a housing rotatably mounted in the center portion of the bottom of said tank, the bottom end of said auger being rotatably mounted in said housing, a horizontal auger supported by said housing, and extending radially from said housing and terminating near the cylindrical wall of said tank, said horizontal auger being spaced a slight distance above the bottom of said tank, an inlet delivery conduit leading to said vertical auger, connecting means in said housing for connecting said augers and thereby causing said horizontal auger to be rotated by the rotation of said vertical auger, means for disconnecting said connecting means and thereby discontinuing the rotation of said horizontal auger while said vertical auger is rotating, whereby the rendering of said horizontal auger entirely inactive while said vertical auger is rotating will restrain the mixing of material already in said tank and additional material being introduced into said tank and distributed by said vertical auger.

3. In a feed mixer, a mixing tank having a substantially flat bottom wall, an upper vertical auger centrally positioned in said tank, means for rotating said vertical auger, a conveyor tube surrounding said vertical auger, said tube being open at the bottom and terminating a spaced distance above said bottom wall of said tank, a lower horizontal auger extending radially from the axis line of said vertical auger and located below said vertical auger and said conveyor tube, said lower auger spaced a slight distance above said bottom wall of said tank, means in said tank connecting said lower auger with said vertical auger for causing said lower auger to be rotated by said upper vertical auger, and optionally operable means for moving said lower auger around in the bottom portion of said tank about the axis line of said upper vertical auger as an axis.

References Cited in the file of this patent

UNITED STATES PATENTS

| | | |
|---|---|---|
| 376,626 | Belton | Jan. 17, 1888 |
| 400,807 | Foepfer | Apr. 2, 1889 |
| 841,030 | Marshall | Jan. 8, 1907 |
| 961,958 | Hartley | June 21, 1910 |
| 1,055,475 | Koolman et al. | Mar. 11, 1913 |
| 1,274,548 | Holnagel | Aug. 6, 1918 |
| 1,721,553 | Haines | July 23, 1929 |
| 2,101,490 | Bullock et al. | Dec. 7, 1937 |
| 2,592,559 | Graham et al. | Apr. 15, 1952 |
| 2,693,873 | Martin | Nov. 9, 1954 |
| 2,825,511 | Byberg | Mar. 4, 1958 |
| 2,828,112 | Kammer | Mar. 25, 1958 |
| 2,895,721 | Jacobson et al. | July 21, 1959 |
| 2,896,923 | Luscombe | July 28, 1959 |
| 2,960,320 | Heider | Nov. 15, 1960 |